United States Patent
Oberhaensli

(10) Patent No.: US 11,079,133 B2
(45) Date of Patent: Aug. 3, 2021

(54) ELECTRONIC CONTROL SYSTEM FOR ELECTROSTATIC PRECIPITATORS CONNECTED IN SERIES

(71) Applicant: Clean Air Enterprise AG, Holzhaeusern (CH)

(72) Inventor: Rene Oberhaensli, Unteraegeri (CH)

(73) Assignee: Clean Air Enterprise AG, Holzhaeusern (CH)

(*) Notice: Subject to any disclaimer, the term of this patent is extended or adjusted under 35 U.S.C. 154(b) by 219 days.

(21) Appl. No.: 16/476,067

(22) PCT Filed: Jan. 29, 2018

(86) PCT No.: PCT/EP2018/052090
§ 371 (c)(1),
(2) Date: Jul. 3, 2019

(87) PCT Pub. No.: WO2018/138315
PCT Pub. Date: Aug. 2, 2018

(65) Prior Publication Data
US 2020/0003445 A1    Jan. 2, 2020

(30) Foreign Application Priority Data

Jan. 30, 2017 (CH) .......................................... 96/17

(51) Int. Cl.
*F24F 11/54* (2018.01)
*F24F 11/49* (2018.01)
(Continued)

(52) U.S. Cl.
CPC .............. *F24F 11/49* (2018.01); *F24F 8/192* (2021.01); *F24F 11/54* (2018.01); *F24F 11/65* (2018.01);
(Continued)

(58) Field of Classification Search
None
See application file for complete search history.

(56) References Cited

U.S. PATENT DOCUMENTS

2002/0069760 A1* 6/2002 Pruette ...................... B03C 3/47
96/70
2006/0282549 A1* 12/2006 Vinnemann ....... H04L 29/12009
710/3
(Continued)

FOREIGN PATENT DOCUMENTS

| DE | 69935452 T2 | 11/2007 |
| RU | 2555229 C2 | 7/2015 |
| WO | 2009011898 A2 | 1/2009 |

OTHER PUBLICATIONS

WIPO PCT IPRP dated Jul. 30, 2019 Concerning related Case PCT/EP2018/050093.
(Continued)

*Primary Examiner* — Bernard G Lindsay
(74) *Attorney, Agent, or Firm* — CanaanLaw, P.C.; David B. Ritchie

(57) ABSTRACT

The invention concerns an electrostatic precipitator comprising an ionisation stage, a collector stage and a power supply. The power supply comprises a first high-voltage power supply unit for applying a first DC high voltage to the ionization stage and a second high-voltage power supply unit for applying a second DC high voltage to the collector stage. The first high-voltage power supply unit is configured to operate the ionization stage current-controlled. A current sensor required for this is advantageously arranged in the return line carrying low voltage, for which purpose the first high-voltage power supply unit and the second high-voltage power supply unit are galvanically isolated from the mains connection and from each other.

12 Claims, 2 Drawing Sheets

(51) Int. Cl.
*F24F 11/88* (2018.01)
*F24F 11/65* (2018.01)
*G05B 19/042* (2006.01)
*F24F 8/192* (2021.01)
*F24F 110/64* (2018.01)

(52) U.S. Cl.
CPC ............ *F24F 11/88* (2018.01); *G05B 19/042* (2013.01); *F24F 2110/64* (2018.01); *F24F 2203/00* (2013.01); *G05B 2219/2614* (2013.01)

(56) References Cited

U.S. PATENT DOCUMENTS

| | | | | |
|---|---|---|---|---|
| 2009/0118867 | A1* | 5/2009 | Miyaba | H04L 29/12254 |
| | | | | 700/275 |
| 2009/0260520 | A1* | 10/2009 | Grass | B03C 3/68 |
| | | | | 96/25 |
| 2010/0274945 | A1* | 10/2010 | Westrick, Jr. | H04L 29/12254 |
| | | | | 710/316 |
| 2014/0022941 | A1 | 1/2014 | Apte et al. | |
| 2014/0173081 | A1* | 6/2014 | Knapp | H04L 61/2038 |
| | | | | 709/223 |
| 2014/0223048 | A1* | 8/2014 | Troeger | G06F 13/4286 |
| | | | | 710/106 |
| 2015/0306533 | A1 | 10/2015 | Matlin et al. | |
| 2015/0372831 | A1* | 12/2015 | Kotake | H04L 61/1505 |
| | | | | 700/276 |
| 2016/0363332 | A1 | 12/2016 | Blackley | |

OTHER PUBLICATIONS

Swiss Patent Search Report in related case.
Russian Patent Office Search Report from Notice of Allowance dated Mar. 26, 2021 in related case.

\* cited by examiner

ELECTRONIC CONTROL SYSTEM FOR ELECTROSTATIC PRECIPITATORS CONNECTED IN SERIES

PRIORITY CLAIM

Applicant hereby claims foreign priority under 35 U.S.C. § 119 from International Patent Application No. PCT/EP2018/052090, filed Jan. 29, 2018, which in turn claims priority to Swiss Application No. 96/17, filed Jan. 30, 2017, the disclosures of which are both herein incorporated by reference.

TECHNICAL FIELD

The invention concerns an electronic control system for the electrostatic precipitators of a building ventilation system in a larger building. Such building ventilation systems are also referred to as monobloc in the air conditioning and ventilation industry.

BACKGROUND OF THE INVENTION

Electrostatic precipitators can filter out particles contained in a gas or air stream. Although they can be used in ventilation, air conditioning and air-conditioning systems, they have not become established in the ventilation industry. In the ventilation industry, especially in building ventilation systems, pocket filters are still used. In a monobloc, depending on the size of the building, a different number of pocket filters are arranged next to each other and on top of each other. If the pocket filters are replaced by electrostatic precipitators of the same size, then an electronic control system is required that can control a large number of electrostatic precipitators.

The invention is based on the task of developing an electronic control system for a large number of electrostatic precipitators, which, in addition to fulfilling its main task of controlling the electrostatic precipitators, enables simple assembly and maintenance, including simple exchange and replacement of defective parts.

SHORT DESCRIPTION OF THE INVENTION

The invention concerns an electronic control system for a number of electrostatic precipitators arranged in a ventilation duct of a building ventilation system. The electronic control system comprises at least one master device and one node device, with one node device being connectable to each of the electrostatic precipitators. The master device(s) is/are a higher-level control centre for the electrostatic precipitators and also supplies/supply the connected node devices with a supply voltage for the electrostatic precipitators.

An optimal design of the master device and the node devices includes the following features, which can be realized individually or in combination, namely
1. The or each master device and each node device has a computing unit and the devices are configured as follows: one or more chains of node devices can be connected to the master device or to each of the master devices, wherein in each chain a first node device can be connected to the associated master device and the further node devices of the chain can each be connected to the predecessor node device, so that the node devices of the chain are connected to one another in series. The master device is the predecessor of the first node device of the connected chain or the first node devices of the connected chains. A unique position number is assigned to each of the node devices in a chain. In a configuration mode, the computing unit of the master device(s) is configured to cause the computing unit of the first node device in each connected chain to execute a configuration program that is configured:
   to receive the position number of its predecessor and to assign itself the position number increased by the value 1 and to store it in the node device,
   to determine whether a subsequent node device is connected and, if this is the case, to cause the computing unit of the subsequent node device to execute the configuration program.
2. The electrostatic precipitators can contain a coding formed, for example, by permanent magnets. In order to detect the coding, it is advantageous for the node device to have one or more sensors and the configuration program is additionally configured to determine the coding of the connected electrostatic precipitator from the output signal of the sensor or from the output signals of the sensors.
3. Each of the node devices has a galvanic isolating element for transmitting the supply voltage from the node device to the connected electrostatic precipitator. This enables the control of the ionization stage and the collector stage of the electrostatic precipitator according to the principles described in the PCT application no. PCT/EP2018/050093.

The electronic control system is also preferably equipped for controlling electrostatic precipitators of different sizes, whereby each of the electrostatic precipitators has a predetermined size and comprises an ionization stage and a collector stage. The control of each of the electrostatic precipitators is carried out in particular by presetting an ionisation current flowing through the ionisation stage and a DC high voltage to be applied to the collector stage, the ionisation current being adapted in particular to the air volume flow flowing through the ventilation duct and the size of the electrostatic precipitator. The DC high voltage applied to the collector stage is also advantageously adapted to the air volume flow.

The or each master device can be connectable to a building control device, whereby the building control device transmits a control signal to the or each master device, which is a measure of the air volume flow flowing through the ventilation system. The master device(s) may also be part of a building control device. The master device(s) is/are configured to transmit the control signal transmitted by the building control device or a control signal derived therefrom to the node devices. The node devices are advantageously configured to determine the ionisation current and/or the DC high voltage on the basis of the at least one control signal and optionally further parameters, such as for example the size of the electrostatic precipitator, and to transmit them to the connected electrostatic precipitator.

The invention is explained in more detail below by means of exemplary embodiments and the drawing.

DETAILED DESCRIPTION OF THE INVENTION

Figure 1:
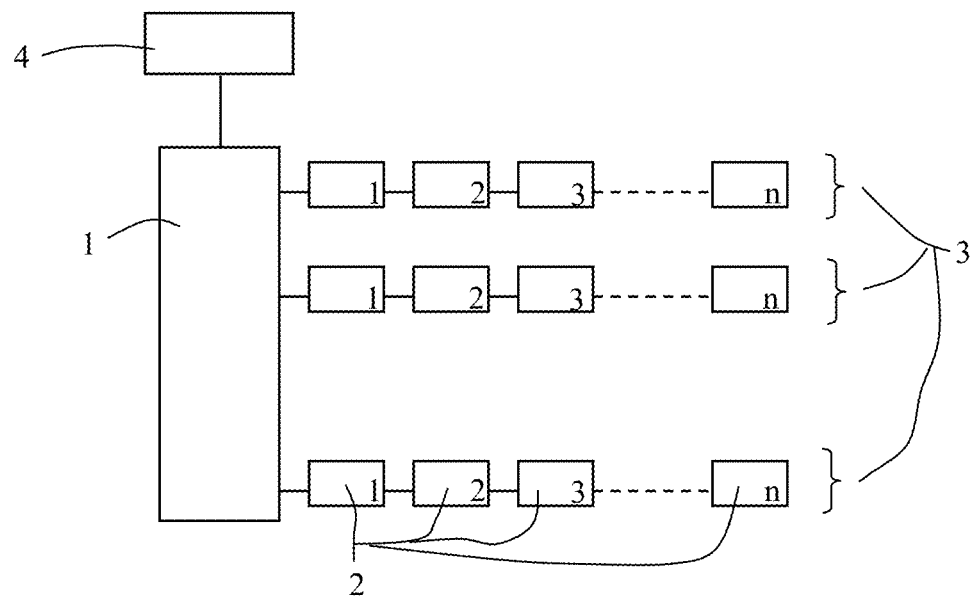
FIG. 1-3 each show a schematic diagram of an electronic control system in accordance with the invention for the electrostatic precipitators of a building ventilation system.

FIG. 1 shows a schematic diagram of an electronic control system according to the invention for the electrostatic precipitators of a building ventilation system according to a first embodiment. The electrostatic precipitators comprise an ionization stage and a collector stage and one or two high-voltage power supply units for supplying the ionization stage and the collector stage with DC high voltages. The electronic control system comprises a central master unit 1 and per electrostatic precipitator a node device 2. The node device 2 can be attached and electrically connected to the associated electrostatic precipitator, preferably by means of mechanical means that can be attached without tools and removed again. It supplies the associated electrostatic precipitator with electrical energy and controls the high voltage power supply unit or power supply units for the ionisation stage and the collector stage of the associated electrostatic precipitator. The master device 1 and each node device 2 has a computing unit. The computing units are for example microcontrollers, microcomputers and the like.

The node devices 2 are connected to the master device 1 via one or more chains 3. In each chain 3, a first node device 2 can be connected to the master device 1 and the other node devices 2 can each be connected to the predecessor node device 2, so that the node devices 2 of the same chain 3 are connected to each other in series. The master device 1 is the predecessor of the first node device 2 of a chain 3. The master device 1 and the node devices 2 are connected via connection cables equipped with plugs. The connecting cables comprise, for example, two lines for the supply of the node devices 2 with a first supply voltage of, for example, 12 V, two further lines for the supply of the electrostatic precipitators with a second supply voltage of, for example, 24 V or AC mains voltage of, for example, 230 V, and one or more data lines for the transmission of data and commands. The 12 V and 24 V lines are preferably galvanically isolated from each other. The first supply voltage is used to supply the electronics of the master device 1 and the node devices 2 with electrical energy. The second supply voltage is used to supply the electrostatic precipitators with electrical energy.

A unique position number is assigned to each of the node devices 2 of a chain 3. The node devices 2 are not configured when they leave the factory, i.e., their position number is either undefined or set to a high value that does not occur in practice, and they do not contain any data related to the building system. The assignment of the position number takes place automatically after connecting the node unit 2 to one of the electrostatic precipitators of the building ventilation system and connecting it to the master unit 1 in accordance with the schematic diagram shown in FIG. 1, i.e., without an operator having to assign the position number.

The configuration of the electronic control system of the electrostatic precipitators of a building ventilation system is carried out using a master configuration program installed on the computing unit of the master unit 1 and a node configuration program installed on the computing unit of the node devices 2.

The computing unit of the master device 1 is configured to execute, in a configuration mode, the master configuration program which causes the computing unit of the first node device 2 of each chain 3 to execute the node configuration program, the node configuration program being configured to receive the position number of its predecessor and to assign to and to store in the node device the position number increased by the value 1, to determine whether a subsequent node device is connected and, if this is the case, to cause the computing unit of the subsequent node device to execute the configuration program.

If there is no subsequent node device 2, then the node configuration program of the last connected node device 2 of a chain 3 transmits its position number to its predecessor node device 2, which in turn transmits it to its predecessor node device 2, etc. In this way the master device 1 receives the position number of the last node device 2 from each of the chains 3 and then knows the number of node devices 2 of each chain 3.

In this configuration procedure, the master device 1 is treated as the predecessor of the first node device 2 of a chain 3. The configuration program of the master device 1 is therefore configured to pass a position number to the first node device 2 of a chain 3, which is then increased by the value 1 by the configuration program of the first node device 2 of the chain 3. For example, the position number passed by the master device 1 has the value 0 for all chains 3. The position number of each node device 2 of a chain 3 then has the value corresponding to the position of the node device 2 in the chain 3. I.e., the first node device 2 of a chain 3 has the position number 1, the second node device 2 of a chain 3 has the position number 2, etc. Such an assignment of position numbers to the node devices 2 of the electrostatic precipitators is shown in FIG. 1 by numbers arranged in the lower right corner of the node devices 2.

The position number of the master device 1 can also be a different position number for each of the chains 3, for example for the first chain 3 the number 0 and for the following chains 3 the position number of the last node device 2 of the previous chain 3. In this way the node devices 2 of all chains 3 can be numbered consecutively.

The master device 1 and the node devices 2 contain one or more further programs with which the master device 1 can address each node device 2 via its position number and its chain number (or its sole position number) and exchange commands and data with it.

The electrostatic precipitators are provided in several sizes, in particular three sizes, which are referred to as 1/1, 1/2 and 3/4 sizes. The electrostatic precipitators are preferably provided with a code for the size and possibly further parameters and the node devices 2 contain one or more sensors in order to determine the code of the connected electrostatic precipitator and from this to determine the size and the further parameters if there are. The coding is made for example by means of two magnets arranged at a distance from each other on the electrostatic precipitator and two magnetic field sensors mounted accordingly on the node device 2. The output signal of the first magnetic field sensor indicates whether the first magnet is present. The output signal of the second magnetic field sensor indicates whether the second magnet is present. The following table shows a possible coding:

| magnet 1 | magnet 2 | coding |
| --- | --- | --- |
| not present | not present | no electrostatic precipitator |
| present | not present | 1/1 electrostatic precipitator |
| not present | present | 1/2 electrostatic precipitator |
| present | present | 3/4 electrostatic precipitator |

The control of the ionization stage of the electrostatic precipitators is preferably carried out by setting the ionization current which is to flow through the ionization stage, and the control of the collector stage of the electrostatic precipitators is carried out by setting the collector high voltage which is to be applied to the collector stage. The master device 1 can preferably be connected to a higher-level building control device 4 or is part of a building control device and the electronic control system is configured to control the ionisation currents and the collector high voltage according to the operating status of the entire building ventilation system. An example of this: The air volume flow can be adjusted by means of a fan between zero and a maximum air volume flow. The building control device 4 communicates with the master device 1 and transmits a control signal to it which refers to the current air volume flow, preferably as a percentage of the maximum air volume flow, or a quantity corresponding to it. The master device 1 is configured to transmit the control signal or a control signal derived from it to the node devices 2, which determine and set or regulate the operating parameters of the connected electrostatic precipitator on the basis of the control signal. The master device 1 can in particular be configured to convert the control signal received from the building control device 4, which represents the current air volume flow flowing through a ventilation duct in which the electrostatic precipitators are arranged, into a control signal derived therefrom, which represents the current air volume flow flowing through an electrostatic precipitator of the size 1/1. The operating parameters are in particular the ionisation current and the collector high voltage. The ionisation current to be set preferably depends not only on the current air volume flow, but also on the size of the electrostatic precipitator. The node device 2 therefore determines the ionisation current to be set on the basis of the transmitted control signal and the size of the connected electrostatic precipitator determined from the detected coding, and the collector high voltage to be set on the basis of the transmitted control signal alone. The building control device 4 and the master device 1 can also be configured to transmit other or additional control commands.

The node device 2 can be configured to transmit the size and any other determined parameters of the electrostatic precipitator to the corresponding master device 1. This transmission can, for example, be carried out in the configuration mode by the configuration program.

The node devices 2 can be configured as described above to use software to determine whether a subsequent node device 2 is connected or not. However, the node devices 2 can also be equipped with hardware components that support this task. For example, the inputs and outputs of the node devices 2 may contain logic components that ensure that a line of the connecting cable existing between two node devices 2 carries the binary value "0" if no subsequent node device 2 is connected and carries the binary value "1" if a subsequent node device 2 is connected.

Figure 2:
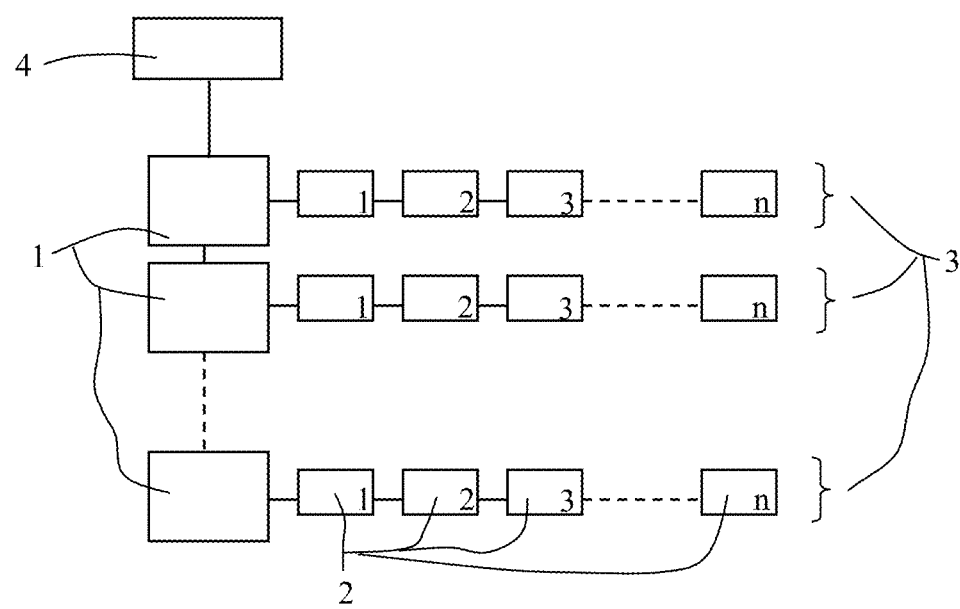

FIG. 2 shows a schematic diagram of an electronic control system according to the invention for the electrostatic precipitators of a building ventilation system according to a second embodiment. In this embodiment, a separate master device 1 is provided for each chain 3. Each of the master devices 1 is preferably supplied by a separate power supply unit with the second supply voltage of, in this example, 24 V. Whereas the first supply voltage of, in this example, 12 V can be supplied by a single, common power supply unit. The master devices 1 are connected to each other via a bus. The first master device 1 is configured so that it can be connected to the building control device 4.

When executing the configuration procedure, the master devices 1 are treated as predecessors of the first node device 2 of the assigned chain 3. The assignment of the position numbers to the node devices 2 of each of the chains 3 is carried out as described above for the first embodiment.

The master devices 1 each communicate individually, but via a common bus, with the building control device 4 or they communicate with a main master device that communicates with the building control device 4. The main master device can be the master device 1 of the first chain 3 or an additional master device without 24 V power supply (or 230 V power supply, respectively).

In all examples, the 24 V power supply unit (or 230 V power supply unit, respectively) can be integrated into the master device 1 or be a separate component.

Figure 3:
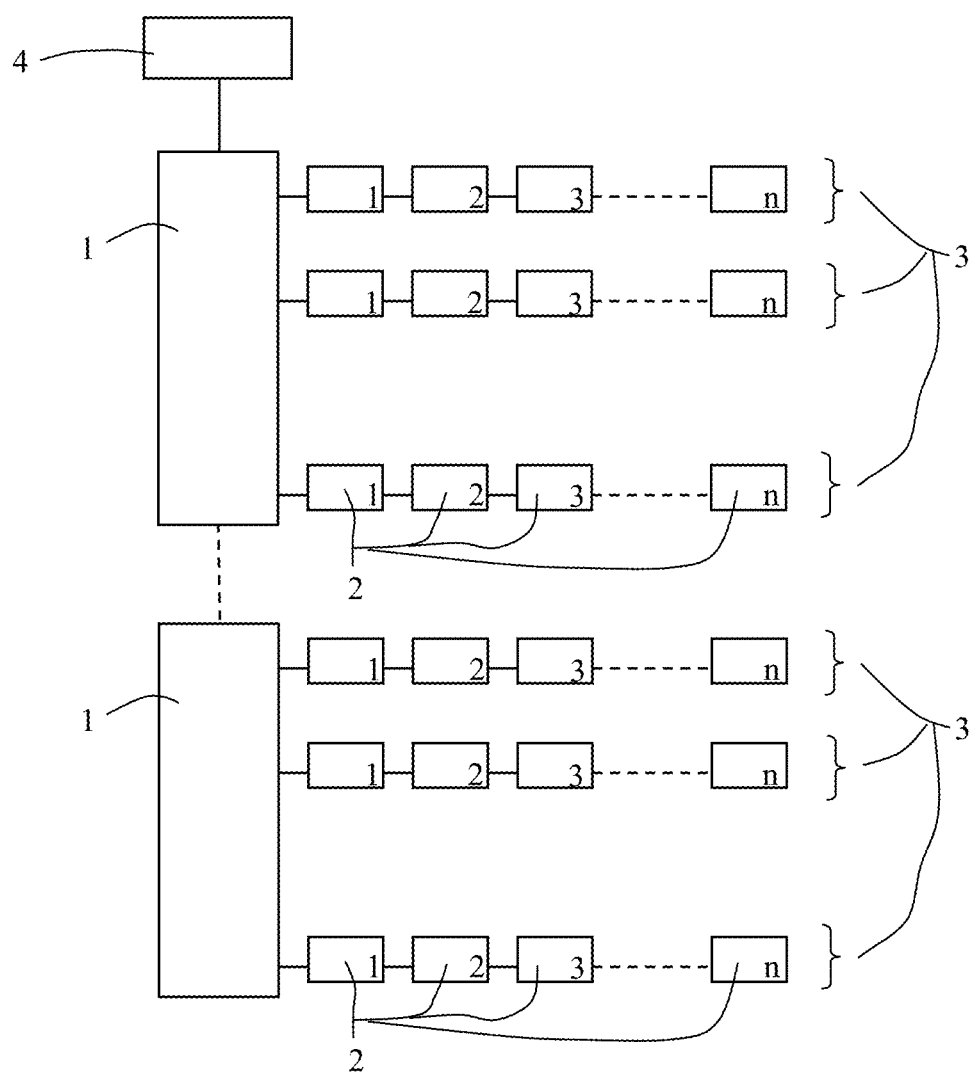

FIG. 3 shows a schematic diagram of an electronic control system according to the invention for the electrostatic precipitators of a building ventilation system according to a third embodiment. In this embodiment, several master devices 1 are provided and one or more chains 3 of node devices 2 can be connected to each master device 1.

In all embodiments, the node devices 2 of each chain 3 can be numbered consecutively from 1 to n, where the number n denotes the number of node devices 2 of the corresponding chain, or the node devices 2 of all chains 3 can be numbered consecutively from 1 to m, where the number m denotes the total number of node devices 2 of the electronic control system, or the node devices 2 of all chains 3 connected to the same master device 1 may be numbered consecutively from 1 to k, where the number k denotes the total number of node devices 2 connected to the same master device 1.

The invention makes it possible to individually address and parameterize each node device 2 and thus each electrostatic precipitator of a large array of electrostatic precipitators. A failure occurring with an arbitrary node device 2 or electrostatic precipitator can thus be localized and possibly eliminated automatically by appropriate control commands.

The node device 2 supplies the associated electrostatic precipitator with the second supply voltage (e.g. 24 V DC or 230 V AC, respectively). This supply voltage is preferably transmitted via a galvanic isolating element, i.e., the node device 2 and the associated electrostatic precipitator are preferably galvanically isolated, as described in the PCT application no. PCT/EP2018/050093.

While embodiments of this invention have been shown and described, it would be apparent to those skilled in the art that more modifications than mentioned above are possible without departing from the inventive concepts herein. The invention, therefore, is not to be restricted except by the appended claims and their equivalents.

What is claimed is:

1. An electronic control system for a number of electrostatic precipitators of a building ventilation system, the electronic control system comprising:
   at least one master device and a plurality of node devices, wherein
   each of the plurality of node devices is coupled to a corresponding electrostatic precipitator,
   the at least one master device and each node device having a respective computing unit,
   each node device having a respective node configuration program,
   at least one chain of node devices is connected to the at least one master device,
   wherein in each chain of node devices a first node device is directly connected to the associated master device and the further node devices of the chain of node devices are each connected to a predecessor node device, so that the node devices of the chain are connected to one another in series, the at least one master device being the predecessor of the first node device of the connected chain of node devices, and a position number is assigned to each of the node devices, and wherein, the computing unit of the at least one master device, is configured, in a configuration mode, to cause the computing unit of the first node device of each connected chain to execute its node configuration program:

wherein, each node configuration program of each node device is configured to receive the position number of its predecessor and to assign itself a position number increased by the value 1 relative to the position number of its predecessor and to store the position number assigned to itself in its respective node device, and to determine whether a subsequent node device is connected and, if this is the case, to cause the computing unit of the subsequent node device to execute its respective node configuration program, and if this is not the case, to transmit its position number to its predecessor node device, which in turn transmits it to its predecessor node device until the associated master device receives the position number from the first node device of the chain.

2. The electronic control system according to claim 1, wherein each of the node devices has one or more sensors in order to detect a coding of the corresponding connected electrostatic precipitator, and each node's configuration program is additionally configured to determine the coding of the connected electrostatic precipitator from the output signal of the sensor or from the output signals of the sensors.

3. The electronic control system according to claim 1, wherein at least one master device supplies the connected node devices with a supply voltage for the corresponding electrostatic precipitators, and each of the node devices has a galvanic isolating element for transmitting the supply voltage from the node device to the corresponding connected electrostatic precipitator.

4. The electronic control system according to claim 2, wherein at least one master device supplies the connected node devices with a supply voltage for the corresponding electrostatic precipitators, and each of the node devices has a galvanic isolating element for transmitting the supply voltage from the node device to the corresponding connected electrostatic precipitator.

5. The electronic control system according to claim 1, wherein each of the electrostatic precipitators has a predetermined size and comprises an ionization stage and a collector stage, and the control of each of the electrostatic precipitators is effected by presetting an ionization current flowing through the ionization stage and a DC voltage to be applied to the collector stage, wherein the at least one master device is connectable to a building control device or is part of a building control device, the at least one master device is configured to transmit a control signal transmitted from the building control device or a control signal derived therefrom to the node devices, and each of the node devices is configured to determine, for the associated electrostatic precipitator, the ionization current to be set on the basis of the transmitted control signal, or the transmitted control signal and the size of the connected electrostatic precipitator or configured to determine the DC voltage to be applied to the collector on the basis of the transmitted control signal.

6. The electronic control system according to claim 5, wherein the control signal transmitted to the node devices is a measure of the current air volume flow flowing through a ventilation duct in which the electrostatic precipitators are arranged.

7. The electronic control system according to claim 2, wherein each of the electrostatic precipitators has a predetermined size and comprises an ionization stage and a collector stage, and the control of each of the electrostatic precipitators is effected by presetting an ionization current flowing through the ionization stage and a DC voltage to be applied to the collector stage, wherein the at least one master device is connectable to a building control device or is part of a building control device, the at least one master device is configured to transmit a control signal transmitted from the building control device or a control signal derived therefrom to the node devices, and each of the node devices is configured to determine, for the associated electrostatic precipitator, the ionization current to be set on the basis of the transmitted control signal, or the transmitted control signal and the size of the connected electrostatic precipitator or configured to determine the DC voltage to be applied to the collector on the basis of the transmitted control signal.

8. The electronic control system according to claim 7, wherein the control signal transmitted to the node devices is a measure of the current air volume flow flowing through a ventilation duct in which the electrostatic precipitators are arranged.

9. The electronic control system according to claim 3, wherein each of the electrostatic precipitators has a predetermined size and comprises an ionization stage and a collector stage, and the control of each of the electrostatic precipitators is effected by presetting an ionization current flowing through the ionization stage and a DC voltage to be applied to the collector stage, wherein the at least one master device is connectable to a building control device or is part of a building control device, the at least one master device is configured to transmit a control signal transmitted from the building control device or a control signal derived therefrom to the node devices, and each of the node devices is configured to determine, for the associated electrostatic precipitator, the ionization current to be set on the basis of the transmitted control signal, or the transmitted control signal and the size of the connected electrostatic precipitator or configured to determine the DC voltage to be applied to the collector on the basis of the transmitted control signal.

10. The electronic control system according to claim 9, wherein the control signal transmitted to the node devices is a measure of the current air volume flow flowing through a ventilation duct in which the electrostatic precipitators are arranged.

11. The electronic control system according to claim 4, wherein each of the electrostatic precipitators has a predetermined size and comprises an ionization stage and a collector stage, and the control of each of the electrostatic precipitators is effected by presetting an ionization current flowing through the ionization stage and a DC voltage to be applied to the collector stage, wherein the at least one master device is connectable to a building control device or is part of a building control device, the at least one master device is configured to transmit a control signal transmitted from the building control device or a control signal derived therefrom to the node devices, and each of the node devices is configured to determine, for the associated electrostatic precipitator, the ionization current to be set on the basis of the transmitted control signal, or the transmitted control signal and the size of the connected electrostatic precipitator or configured to determine the DC voltage to be applied to the collector on the basis of the transmitted control signal.

12. The electronic control system according to claim 11, wherein the control signal transmitted to the node devices is a measure of the current air volume flow flowing through a ventilation duct in which the electrostatic precipitators are arranged.

* * * * *